United States Patent [19]
Kojima

[11] Patent Number: 5,984,184
[45] Date of Patent: *Nov. 16, 1999

[54] IC CARD READ/WRITER HAVING VERTICALLY MOVING READING CONTACT PINS

[75] Inventor: Susumu Kojima, Sakado, Japan

[73] Assignee: Kabushiki Kaisha Nippon Conlux, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/723,105

[22] Filed: Oct. 1, 1996

[30] Foreign Application Priority Data

Oct. 2, 1995 [JP] Japan ................................. 7-255181

[51] Int. Cl.⁶ .................................................. G06K 17/00
[52] U.S. Cl. ........................... 235/441; 235/479; 235/483
[58] Field of Search .................................... 235/441, 442, 235/475, 479, 482, 486, 483, 484, 485, 492

[56] References Cited

U.S. PATENT DOCUMENTS

| | | | |
|---|---|---|---|
| 4,743,746 | 5/1988 | Muschall et al. | 235/441 |
| 4,827,113 | 5/1989 | Rikuna | 235/441 |
| 4,833,301 | 5/1989 | Shimamura et al. | 235/479 |
| 4,843,221 | 6/1989 | Ohtsuki et al. | 235/441 |
| 4,926,032 | 5/1990 | Shimamura et al. | 235/441 |
| 5,332,890 | 7/1994 | Kitahara | 235/441 |
| 5,508,501 | 4/1996 | Fujimoto et al. | 235/441 |

FOREIGN PATENT DOCUMENTS

| | | |
|---|---|---|
| 0720102 | 7/1996 | European Pat. Off. . |
| 2604008 | 3/1988 | France . |
| 2712430 | 5/1995 | France . |
| 55-500138 | 3/1980 | Japan . |
| 60-207984 | 10/1985 | Japan . |
| 61-16386 | 1/1986 | Japan . |
| 62-180491 | 8/1987 | Japan . |
| 62-194591 | 8/1987 | Japan . |
| 567250 | 3/1993 | Japan . |
| 6139747 | 5/1994 | Japan . |
| 6309511 | 11/1994 | Japan . |
| 765493 | 3/1995 | Japan . |
| 7152884 | 6/1995 | Japan . |

Primary Examiner—Thien Minh Le
Assistant Examiner—Drew A. Dunn
Attorney, Agent, or Firm—Loeb & Loeb LLP

[57] ABSTRACT

A card read/write apparatus for reading or writing information from or into an IC memory region of a card comprises a card carriage formed with an IC exposure opening through which the IC memory region of the card is exposed when the card is placed on the card carriage, and a contact device having contact pins that is protruded into or retracted from the IC exposure aperture while being maintained to be in parallel with the IC memory region of the card so as to contact with or move away from the IC memory region of the card which is exposed from the IC exposure aperture.

9 Claims, 9 Drawing Sheets

IC CARD READ/WRITER HAVING VERTICALLY MOVING READING CONTACT PINS

BACKGROUND OF THE INVENTION

1. Field of the Invention

The present invention relates to a card read/write apparatus for cards provided with at least an IC memory region, and more particularly, it relates to improvements in the contact holder in the card read/write apparatus for electrically connecting to the IC memory region of such cards.

2. Description of the Related Art

Conventionally, in a card read/write apparatus for cards having an optical data storage region and an IC memory region, or cards having a plurality of memory or storage regions such as a magnetic recording region, optical data storage region and IC memory region, there is provided a contact holder equipped with contact pins that get access to and effect electrical connection with the IC memory region of the card for reading information stored in the IC memory region and for writing information into the IC memory region.

Such a conventional contact holder is constituted of a box-type arm which is approximately L-shaped and that rotates about a shaft, as disclosed in Japanese patent laid-open publication numbers 5-67250 or 7-152884.

FIG. 15 is a diagrammatic perspective view showing major parts of a conventional card read/write apparatus equipped with a contact holder as described above.

The card read/write apparatus 1 is constituted of a pair of guide shafts 3 of different length arranged mutually in parallel on a main frame 2, a card carriage 4 that moves back and forth in the X direction along the guide shafts 3, card feed linear motors 5 that drive the card carriage 4 to move back and forth along guide shafts 3, an optical head, not shown, that is arranged above card carriage 4 and that is moved back and forth in the directions (arrow directions Y) perpendicular to the carrying directions of the card carriage 4, and a contact holder 8 that makes direct electrical contact with an IC memory region 6c of a card 6 placed on card carriage 4.

The card 6 as described above includes both an optical data storage region 6b and IC memory region 6c on one side-face 6a constituting its upper surface.

The conventional contact holder 8 described above is constituted of a box-type arm 10 of approximately L-shape, rotatably supported about a shaft 9, and is provided at its tip 10a with a plurality of contact pins (so-called IC contacts) 11 that make electrical contact with the IC memory region 6c. The rear end 10b of the arm 10 is normally biased so as to rotate in clockwise direction about shaft 9 by means of a spring 12, so that arm 10 is normally rotated by a prescribed angle in the clockwise direction by the biasing force of the spring 12 so as to separate IC memory region 6c and contact pins 11, thereby cutting off electrical connection between the IC memory region 6c and contact pins 11.

When, as shown in FIG. 15, card carriage 4 is moved along guide shafts 3 towards contact holder 8, its tip 4a abuts the rear end 10b of arm 10, thereby rotating the arm 10 in the anticlockwise direction about shaft 9 against the biasing force of spring 12, so that IC memory region 6c and contact pins 11 are brought into contact, making an electrical connection. Processing can thereby be performed to read information stored in IC memory region 6c, or to write information into IC memory region 6c.

Optical data storage region 6b is scanned by the optical head, not shown, referred to above, and processing is performed to read the information stored in the optical data storage region 6b or to write information into optical data storage region 6b.

However, with the conventional card read/write apparatus 1 described above, arm 10 of contact holder 8 that approaches and withdraws from IC memory region 6c, as shown in FIG. 15, is of a construction arranged outside the region across which the card carriage 4 runs. With this construction, the total length of the card read/write apparatus 1 is increased and reduction in the size of the card read/write apparatus 1 cannot be achieved.

Furthermore, with the conventional contact holder 8, contact pins 11 were arranged at the tip 10a of arm 10 which was rotatable about shaft 9, and, in order to effect electrical contact between contact pins 11 and IC memory region 6c by rotating the arm 10, all the contact pins 11 and IC memory region 6c had to be made to approach and contact each other while maintaining a mutually parallel state. Consequently, it was difficult to make all the contact pins 11 contact IC memory region 6c with uniform pressure. As a result, the contact pressure between contact pins 11 and IC memory region 6c would at some pins be excessive and at other pins be insufficient, leading to poor contact. Thus, it could become impossible to perform reading of information from IC memory region 6c or writing information into IC memory region 6c.

SUMMARY OF THE INVENTION

Taking into consideration the circumstances described above, an object of the present invention is to provide a card read/write apparatus of small size capable of performing processing for reading or writing of information from or into the IC memory region in a stable manner.

In order to achieve the object referred to above, according to the present invention, in a card read/write apparatus for reading or writing information from or into an IC memory region of a card placed on a card carriage, the card carriage is formed with an IC exposure opening through which the IC memory region is exposed when the card is placed on the card carriage. Further there is provided contact means having contact pins that projected into or retracted from the IC exposure aperture while maintained in parallel with the IC memory region of the card so as to make contact with or move away from the IC memory region which is exposed through the IC exposure aperture, whereby the contact pins of the contact holder are made to approach while maintaining a mutually parallel state of the contact pins and the IC memory region. The result is that the plurality of contact pins and the IC memory region are brought into contact with uniform pressure, thereby enabling reliable electrical connection to be achieved between the plurality of contact pins and the IC memory region. Thus, stable processing to read and write information from or into the IC memory region of the card is performed.

Other objects and advantages of this invention will be easily appreciated from the following detailed description and appended drawings.

DESCRIPTION OF THE PREFERRED EMBODIMENTS

An embodiment of a card read/write apparatus according to the present invention is described in detail below.

Figure 1:
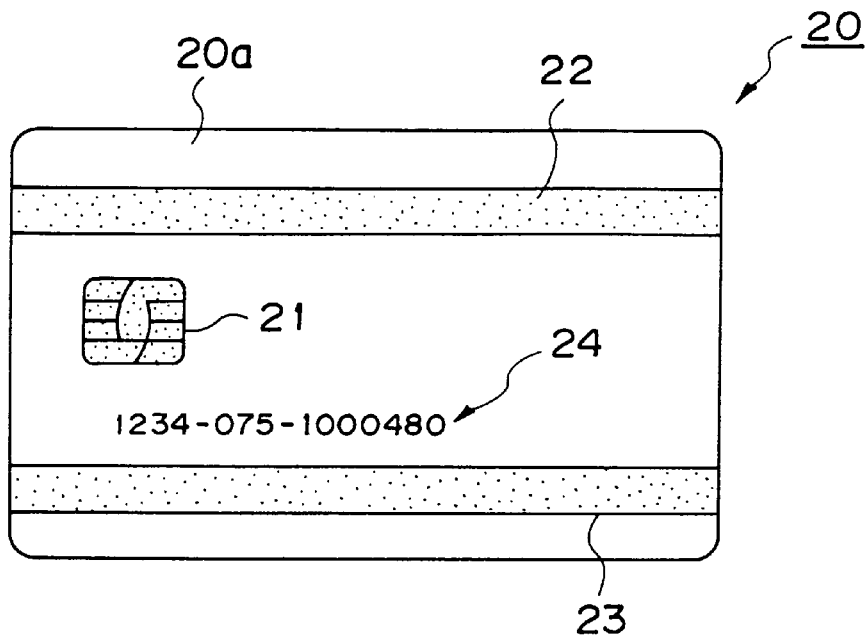
FIG. 1 illustrates one face of a card used in a card read/write apparatus according to an embodiment of the present invention.
Figure 2:
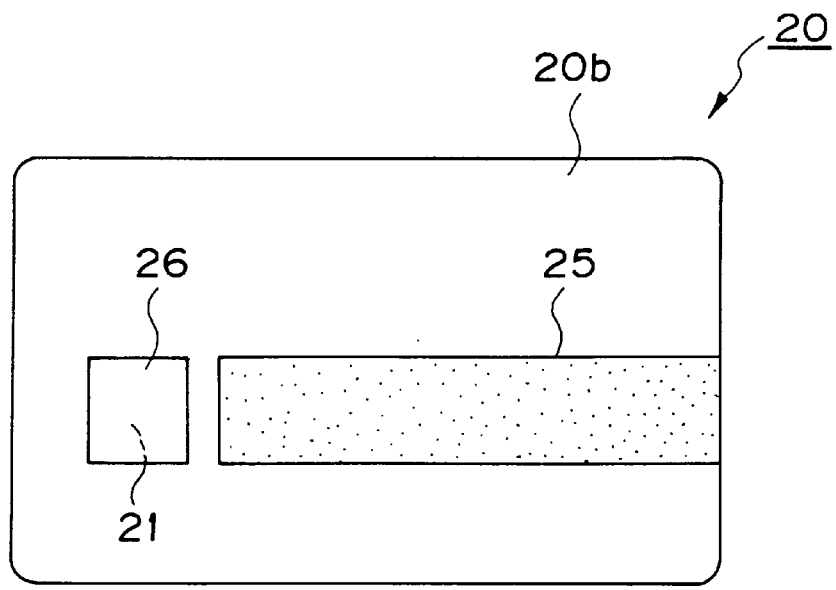
FIG. 2 illustrates the other face of a card used in the card read/write apparatus according to an embodiment of the present invention.

FIG. 1 and FIG. 2 illustrate a view from one side and a view from the other side of a card 20 used in a card read/write apparatus according to the present invention.

As shown in FIG. 1, an IC memory region 21 constituted by a thin IC is arranged near the left edge practically in the middle in the width direction on one side-face 20a of card 20. The upper face of the IC memory region 21 constitutes a contact face that comes in contact with a plurality of contact pins, to be described later. A pair of strip-shaped magnetic recording regions 22, 23 are formed near both side edges of one side-face 20a.

Convex embossed portions 24 denoted by numerals are formed between magnetic recording regions 23 and IC memory region 21.

Furthermore, as shown in FIG. 2, on the other face 20b of card 20, somewhat lower than the middle, there is formed a strip-shaped optical data storage region 25 having a prescribed width.

Reference numeral 26 in FIG. 2 denotes a concealing member for concealing the back face of IC memory region 21.

A card read/write apparatus 30 whereby information can be read from IC memory region 21 or information can be written into IC memory region 21 that is formed on the surface of card 20 described above will be described in detail with reference to the drawings.

Figure 3:
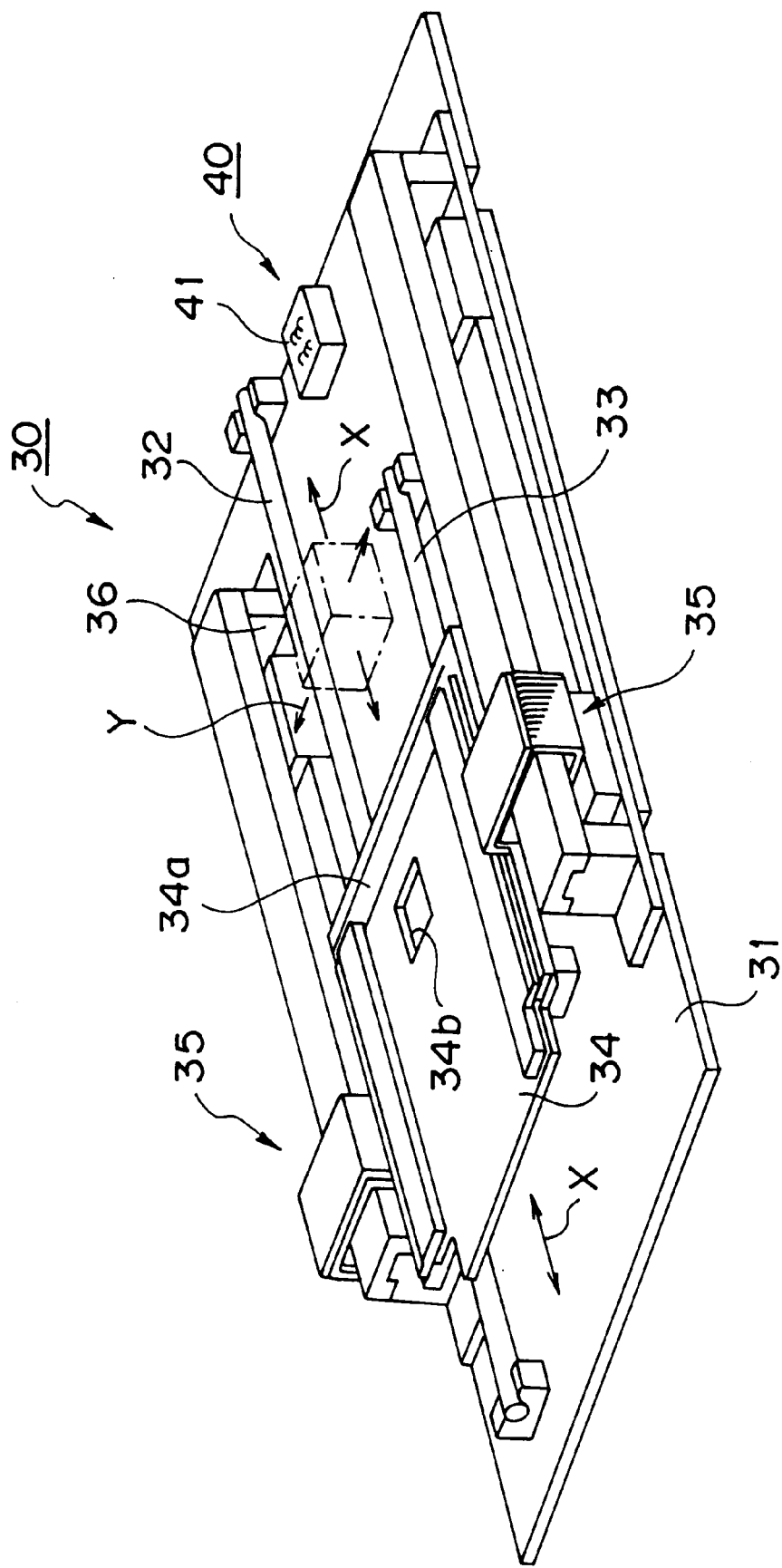
FIG. 3 is a perspective diagram of major parts of the card read/write apparatus according to an embodiment of the present invention.

FIG. 3 is a perspective diagram of the major parts of the card read/write apparatus 30 according to the present invention.

Figure 15:
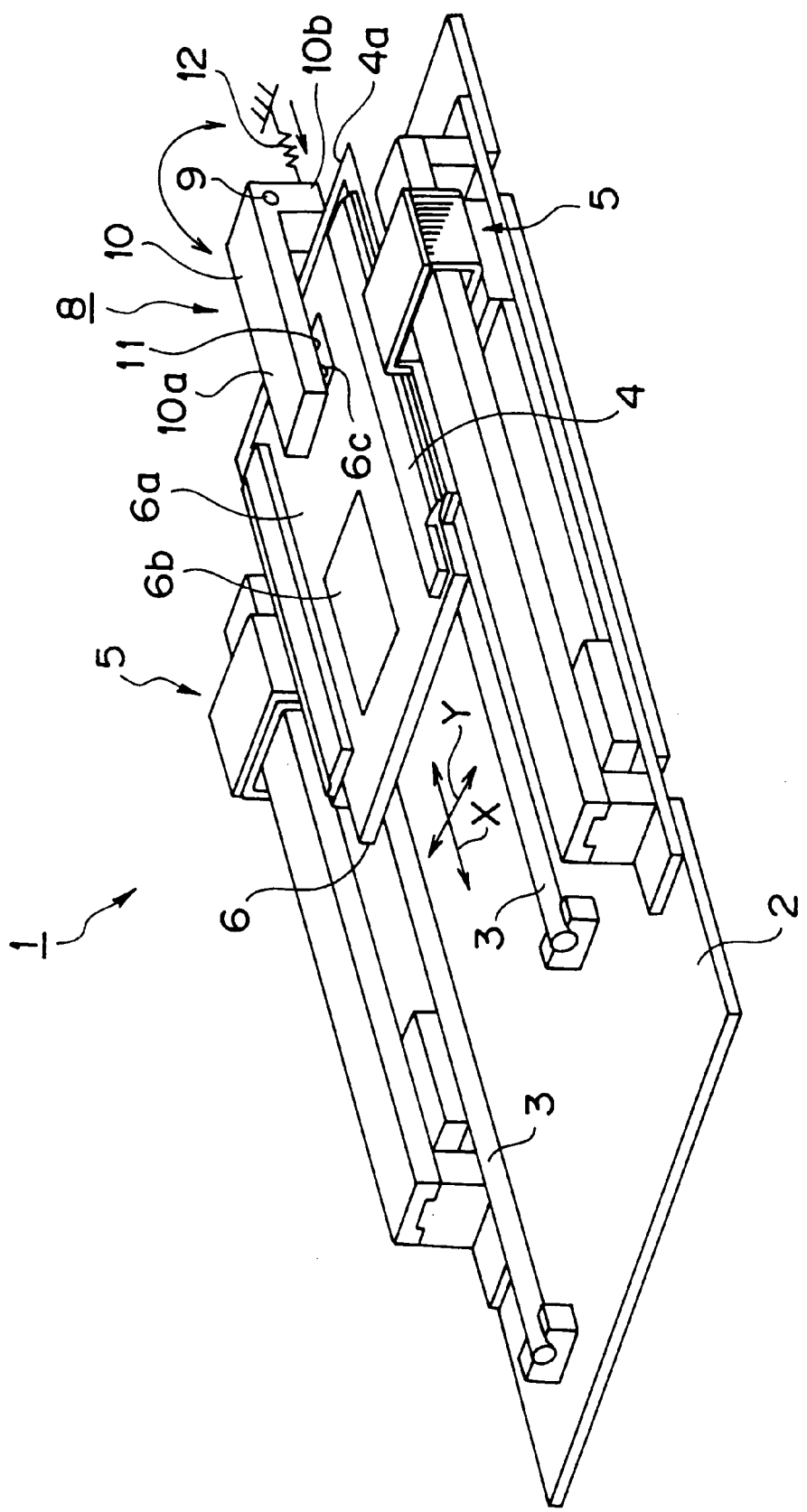
FIG. 15 is a perspective diagram of major parts of a conventional card read/write apparatus.

It should be noted that although card read/write apparatus 30 of the embodiment illustrated below, in actual use, is employed upside-down, for convenience in description of the construction, the detailed description thereof will be given as seen from the same posture as the conventional card read/write apparatus 1 shown in FIG. 15.

The card read/write apparatus 30 comprises a pair of guide shafts 32, 33 of different length arranged mutually in parallel above main frame 31, a card carriage 34 that is free to be moved back and forth in the directions of arrow X along these guide shafts 32, 33, card-carriage linear motors 35 for driving the card carriage 34 back and forth along guide shafts 32, 33, an optical head 36 arranged above card carriage 34 and that moves back and forth in the directions (arrow directions Y) perpendicular to the carrying directions of the card carriage 34, and a contact means 40 that effects movement into and out of contact with IC memory region 21 of the card 20 (FIG. 1, 2) placed on card carriage 34.

Of these components, on the side of tip 34a of card carriage 34, there is formed an IC exposure aperture 34b whereby the IC memory region 21 of the card 20 is exposed when card 20 is placed on the card carriage 34 i.e. when it is placed on card carriage 34 with IC memory region 21 facing downward.

On main frame 31, there is arranged within the moving range of card carriage 34 a contact means 40 to project into or be retracted from IC exposure aperture 34b of card carriage 34.

Figure 4:
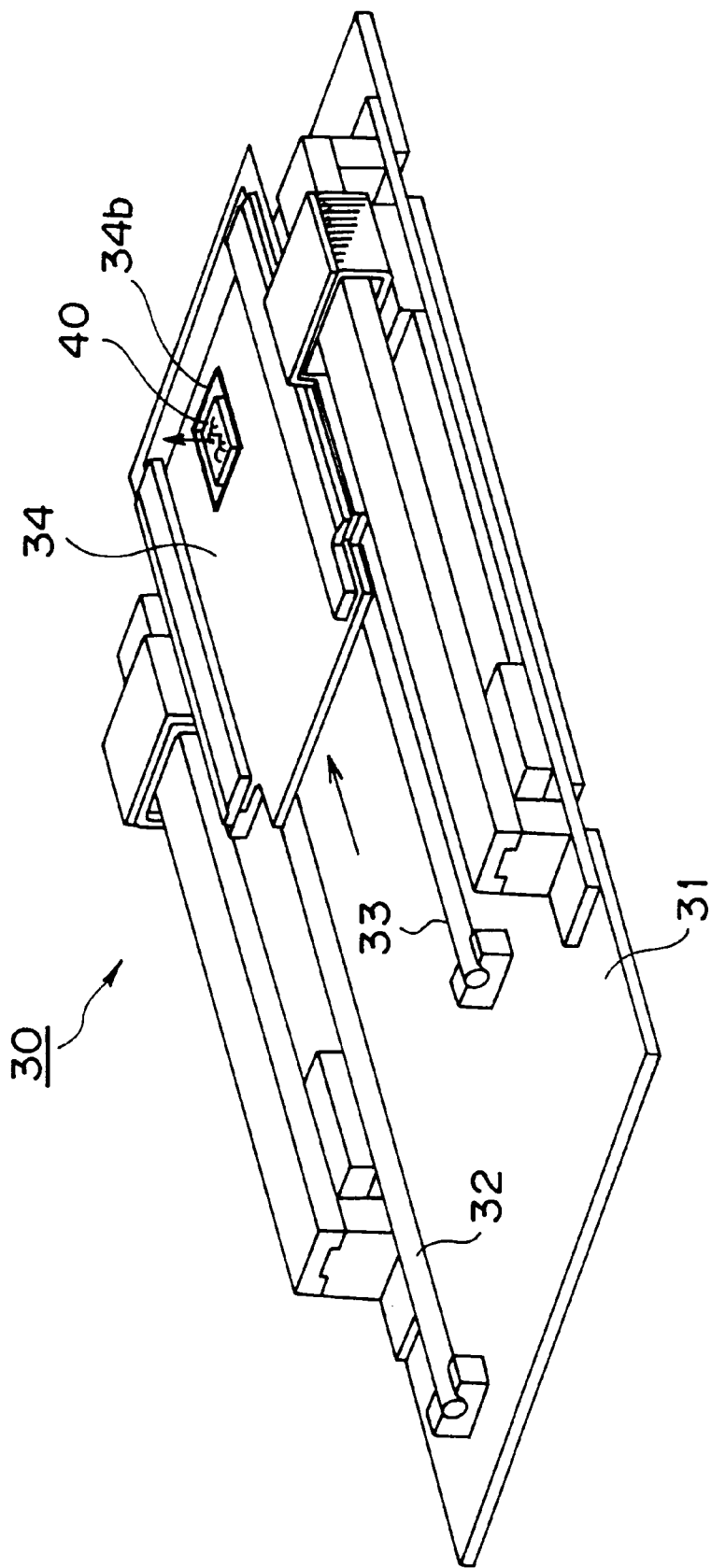
FIG. 4 is a perspective diagram of major parts of the card read/write apparatus according to an embodiment of the present invention.

As shown in FIG. 4, by means of such contact means 40 and IC exposure aperture 34b, when card carriage 34 is moved along guide shafts 32, 33 to the location of contact means 40 and is stopped there, the contact means 40 is projected into or retracted from IC exposure aperture 34b while maintaining itself in parallel with the contact face of IC memory region.

Figure 5:
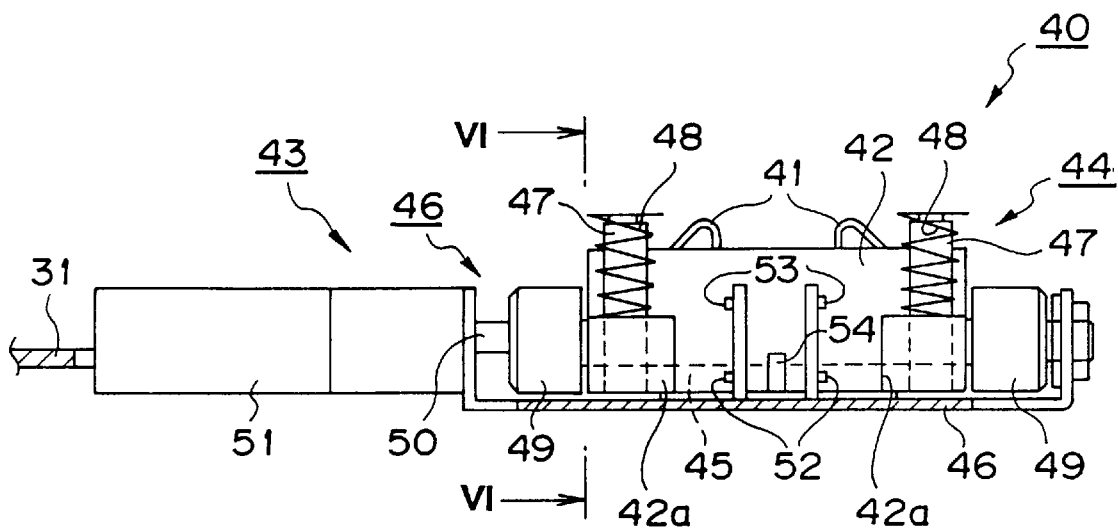
FIG. 5 is a cross-sectional view of major parts showing the contact means of the present invention.
Figure 6:
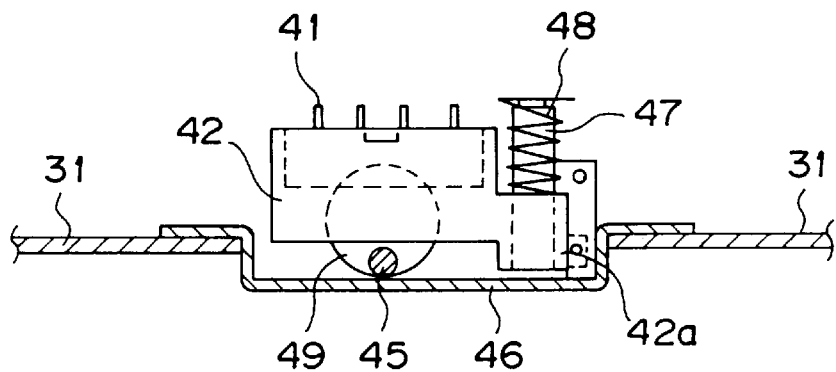
FIG. 6 is a cross-sectional view along the line VI—VI of FIG. 5.

FIG. 5 shows a partial cross-section of contact means 40 referred to above, while FIG. 6 shows its cross-section along line VI—VI. As can be seen from these Figures, contact means 40 comprises a contact holder 42 of rectangular shape in whose upper surface there are provided a plurality of contact pins 41, and a raising and lowering means 43 that raises and lowers the contact holder 42 while maintaining the contact holder 42 in parallel with the contact face of IC memory region 21.

Of these components, raising and lowering means 43 is constituted of a biasing means 44 that biases contact holder 42 downward, a shaft 45 that extends in parallel with the contact face of IC memory region 21 and abuts the bottom face of contact holder 42, and a drive means 46 that drives the shaft 45 vertically in opposition to biasing means 44 while maintaining the shaft in parallel with the contact face of IC memory region 21.

The biasing means 44 is constituted of a pair of guide shafts 47 erected on the bottom face plate 46 of contact holder 42 and a pair of coil springs 48 inserted over the upper ends of the pair of guide shafts 47. The pair of guide shafts 47 are inserted into a pair of bearing units 42a projecting from the side of contact holder 42.

Consequently, with the biasing means 44 as described above, contact holder 42 is normally biased downward through bearing units 42a by the biasing force of the pair of coil springs 48, and is positioned in the initial position shown in FIG. 5 and 6.

Turning now to drive means 46 that effects vertical movement while maintaining the parallel state of shaft 45 with respect to the contact face of IC memory region 21. As shown in FIG. 5, the drive means 46 is constituted of a pair of shaft support members 49 that are free to rotate and whereon the shaft 45 is mounted in a position offset from the center of rotation, and a drive motor 51, the tip of whose rotary shaft 50 is fixed at the center of these shaft support members 49.

In FIGS. 5 and 6, reference numeral 52 indicates a first position sensor comprising a light emitting element and a light receiving element, 53 indicates a second position sensor comprising a light emitting element and a light receiving element, and 54 indicates a shield plate that projects at the side of contact holder 42. When the shield plate 54 shuts off the light path between the elements of first position sensor 52, it is detected that contact holder 42 is in the initial position in FIGS. 5 and 6 and when shield plate 54 reaches a position in which it shuts off the light path between the elements of second position sensor 53, it is detected that contact holder 42 has reached the prescribed raised position.

Next, the action of raising and lowering means 43 will be described.

Figure 7:
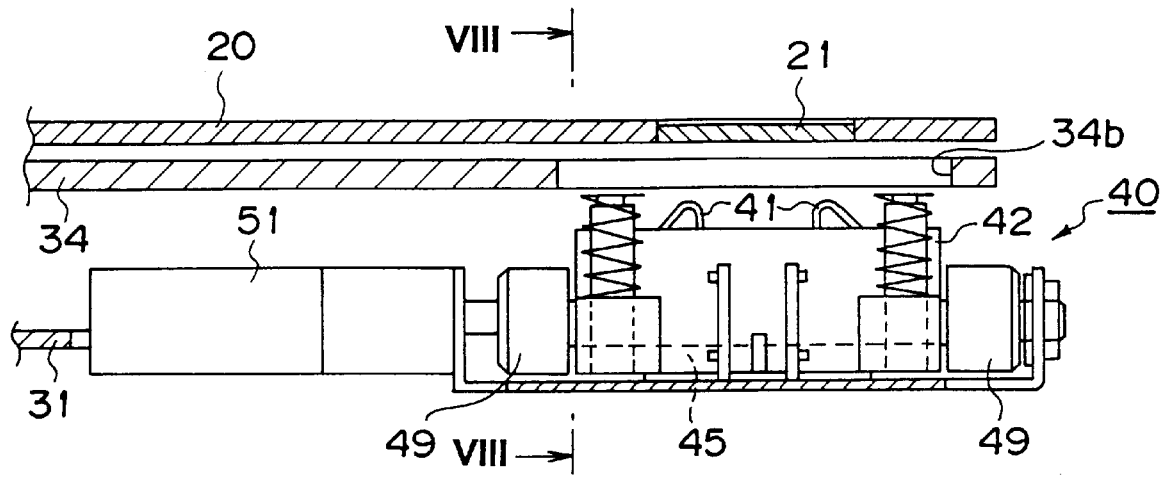
FIG. 7 is a view showing the action of the contact means of the present invention.

As shown in FIG. 7 (in which the same reference numerals are used for the same parts as in FIGS. 3 to 6), after loading a card into card carriage 34 with IC memory region 21 being placed at the front and facing downwards, the card carriage 34 is made to run towards contact means 40 and is stopped in a pre-set position i.e. a position in which IC memory region 21, IC exposure aperture 34b and contact holder 42 are aligned to each other.

Figure 8:
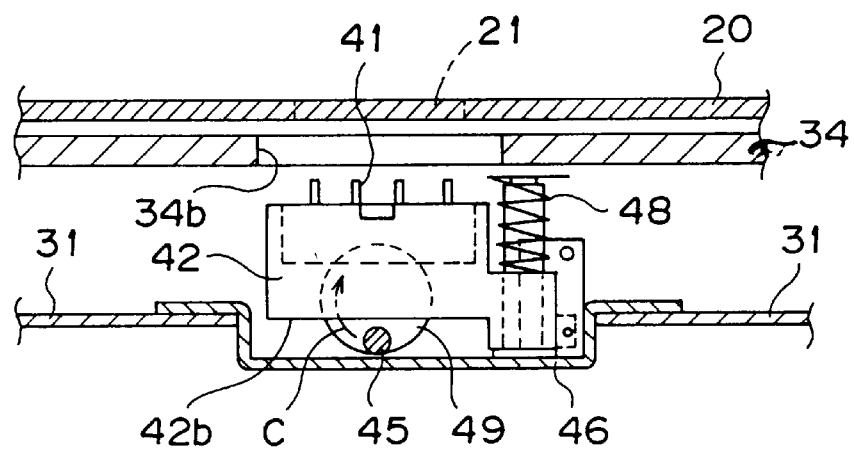
FIG. 8 is a cross-sectional view along the line VIII—VIII of FIG. 7.

After this, when drive motor 51 is actuated, as shown in FIG. 8, which shows a cross-section along the line VIII—VIII of FIG. 7, shaft 45 is rotated in the clockwise direction by means of shaft support members 49 as shown by the arrow C, while maintaining it in parallel with the contact face of IC memory region 21.

When this happens, after shaft 45 abuts bottom face 42b of contact holder 42, the contact holder 42 is moved upwards against the biasing force of coil spring 48 while maintaining it in parallel with contact face of IC memory region 21.

Figure 9:
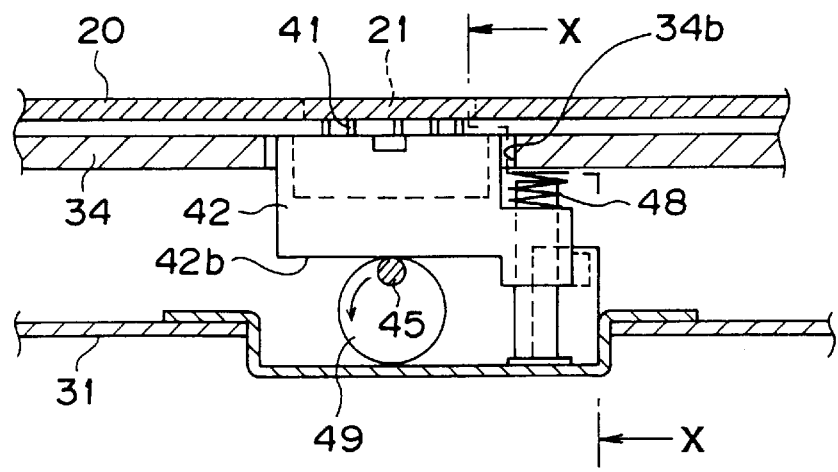
FIG. 9 is a view showing the action of contact means according to the present invention.
Figure 10:
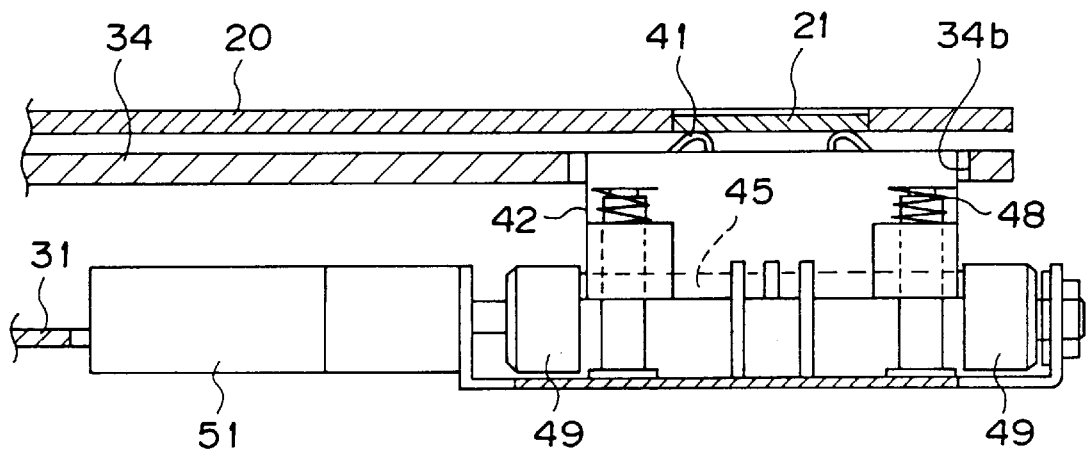
FIG. 10 is a cross-sectional view along the line X—X of FIG. 9.

Thus, shaft 45 abuts the bottom face 42b of contact holder 42 and the contact holder 42 is moved upwards against the biasing force of coil spring 48 while maintaining it in parallel with the contact face of IC memory region 21. Thereupon, as shown in FIG. 9 (in which parts which are the same as FIG. 8 are shown with the same reference numerals) and in FIG. 10 (which is a cross-section along the line X—X of FIG. 9), contact pins 41 of contact holder 42 and IC memory region 21 approach each other while maintaining a mutually parallel state. The plurality of contact pins 41 and IC memory region 21 are thereby brought into contact with uniform pressure, so stable electrical connection can be achieved between each of the contact pins 41 and IC memory region 21.

Subsequent processing for reading information from the IC memory region 21 or writing information to IC memory region 21 can then be performed thanks to the stable electrical connection achieved between contact pins 41 and IC memory region 21 as described above.

Once the processing for reading information from IC memory region 21 or writing information to IC memory region 21 described above has been completed, drive motor 51 is again actuated so that the shaft 45 is rotated by means of shaft support members 49 while maintaining it in parallel with the contact face of IC memory 21.

Then, as shown in FIG. 7 and FIG. 8, contact holder 42 is also moved downwards by the biasing force of coil spring 48 concurrently with shaft 45 and is thereby restored to its initial position.

Figure 11:
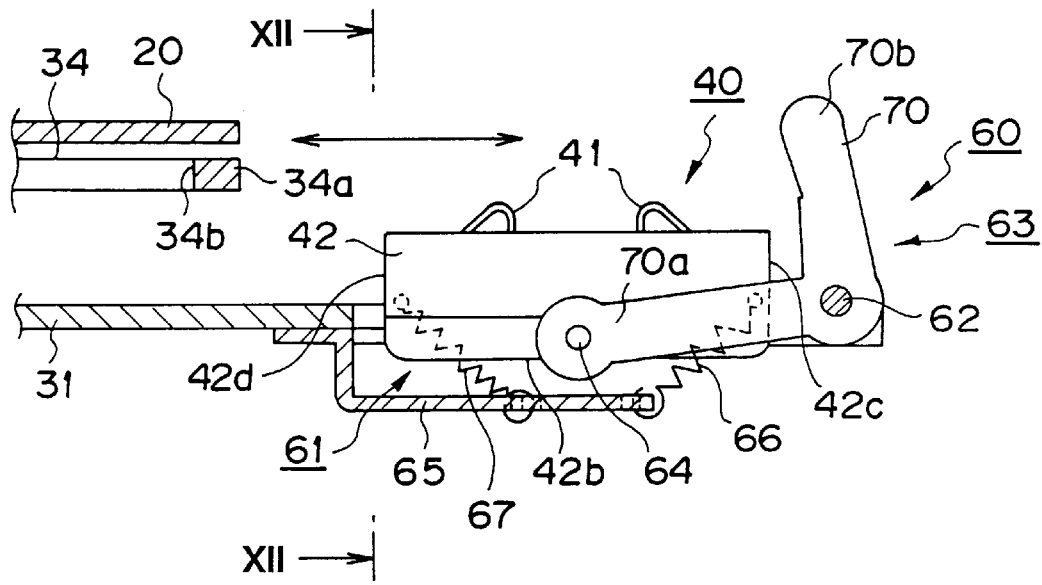
FIG. 11 is a cross-sectional view of major parts illustrating another embodiment of contact means according to the present invention.

In the embodiment described above, raising and lowering means 43 of contact means 40 is constituted of a biasing means 44 biasing contact holder 42 in one direction, a shaft 45 abutting the bottom face 42b of contact holder 42, and a drive means 46 that effects vertical movement of the shaft 45 against biasing means 44 while maintaining the shaft 45 in parallel with the contact face of IC memory region 21. However, the present invention is not restricted to this embodiment. As shown in FIG. 11 (in which parts which are the same as in FIG. 5 are given the same reference numerals) and in FIG. 12 (which is a cross-section along the line XII—XII), a construction is possible wherein the raising and lowering means 60 of contact means 40 is constituted by a biasing means 61 that biases contact holder 42 in one direction while maintaining the contact holder 42 in parallel with the contact face of IC memory region 21 and a link mechanism 63 supported so as to be freely rotatable about shaft 62, one end thereof being supported on a shaft 64 passing through the center of bottom face 42b of the contact holder 42 while its other end is rotated in the clockwise direction about shaft 62 against the biasing force of biasing means 61 when it abuts the card carriage 34, whereby the link mechanism 63 is able to raise contact holder 42 while maintaining the contact holder 42 in parallel with the contact face of IC memory region 21.

The biasing means 61 of the raising and lowering means 60 is constituted of a pair of tensile coil springs 66, 67 having the same spring constant, one end thereof being engaged with a tongue 65 extending from mainframe 31. Of these, the other end of one tensile coil spring 66 is engaged with tip 42c of contact holder 42, while the other end of the other tensile coil spring 67 is engaged with the rear end 42d of contact holder 42.

Turning to the link mechanism 63 of raising and lowering means 60, this is constituted of a pair of L-shaped arms 70 supported on shaft 62, the tip 70a of these arms 70 being supported on shaft 64 arranged so as to pass through the center of bottom face 42b of contact holder 42 and the rear end 70b thereof extends upwards to a position where it is pushed by tip 34a of card carriage 34 as it runs forwards.

The action of raising and lowering means 60 referred to above will now be described.

Figure 12:
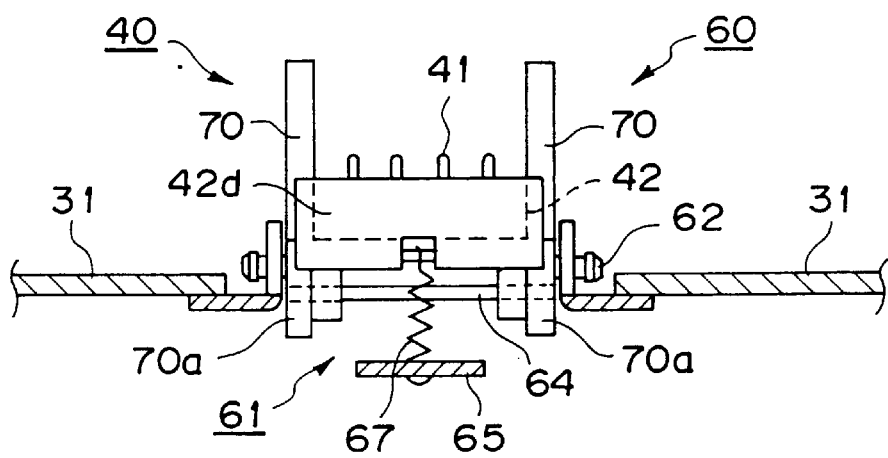
FIG. 12 is a cross-sectional view along the line XII—XII of FIG. 11.

With the raising and lowering means 60 as described above, contact holder 42 is normally pulled downwards by biasing means 61 comprising the pair of tensile coil springs 66, 67 having the same spring constant and with one end respectively engaged with its tip 42c and rear end 42d, and other ends engaged with tongue 65, so, as shown in FIG. 11 and 12, the contact holder 42 is moved downwards in parallel to the contact face of IC memory region 21 while maintaining a balanced condition until it stops in the initial position.

Figure 13:
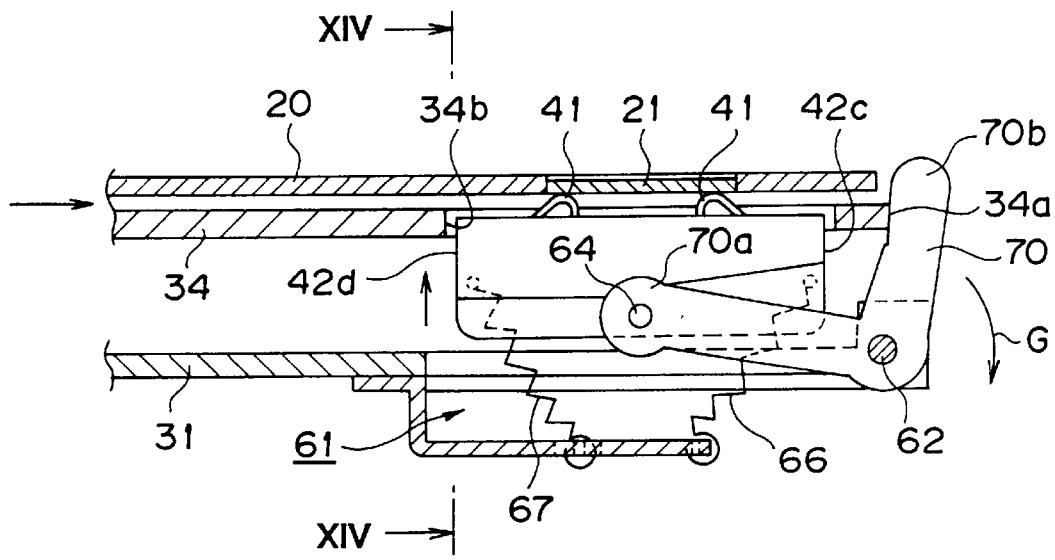
FIG. 13 is a view showing the action of another embodiment of contact means according to the present invention.
Figure 14:
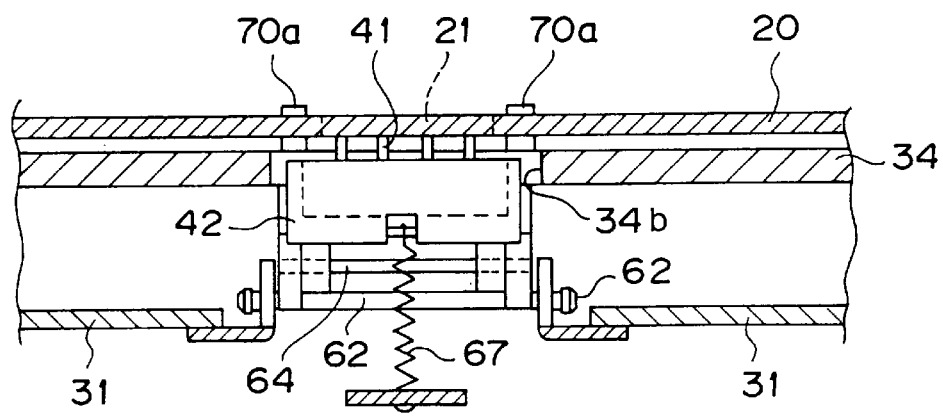
FIG. 14 is a cross-sectional view along the line XIV—XIV of FIG. 13.

As shown in FIG. 13, in which parts that are the same as in FIG. 11 are given the same reference numerals, when card carriage 34 runs in the rightward direction in the drawing and its tip 34a abuts the free end 70b of arm 70, arm 70 is rotated in the clockwise direction as shown by arrow G about shaft 62.

Thus, when arm 70 rotates in the clockwise direction as shown by arrow G about shaft 62, its tip 70a is also rotated in the clockwise direction.

When this happens, contact holder 42 is moved upwards against the biasing force of biasing means 61 by means of shaft 64 that is engaged with the tip 70a of arm 70. However, as contact holder 42 is moved upwards in the condition of keeping its balance by downwards tension provided by means of biasing means 61 comprising the pair of tensile coil springs 66, 67 having the same spring constant and respectively engaged with tip 42c and rear end 42d thereof, contact pins 41 of contact holder 42 and IC memory region 21 are made to approach each other while being held in a mutually parallel state. As a result, contact pins 41 and IC memory region 21 abut with uniform pressure, enabling stable electrical connection between contact pins 41 and IC memory region 21 to be achieved.

The achievement of stable electrical connection between the plurality of contact pins 41 and IC memory region 21 as described above enables subsequent processing to be performed in which information is read from the IC memory region 21 or written to IC memory region 21.

When the processing for reading information from IC memory region 21 or writing information to IC memory region 21 as described above has been completed and card carriage 34 runs in the leftward direction in the Figure, contact holder 42 is moved downwards by the biasing force of biasing means 61 comprising the pair of tensile coil springs 66, 67 and arm 70 is also concurrently restored to its initial position shown in FIG. 11 by rotating in anticlockwise direction about shaft 62.

As described above, with the card read/write apparatus of the present invention, the card carriage is formed with an IC exposure aperture for exposing the IC memory region of the card placed on the card carriage, and there is provided contact means having contact pins. The contact means is so arranged to move towards and away from the IC memory region that is exposed from the IC exposure aperture so as to project into or be retracted from the IC exposure aperture while being maintained to be in parallel with the IC memory region. The contact pins of the contact holder and the IC memory region are therefore brought into proximity while being maintained in a mutually parallel state; abutment between the contact pins and the IC memory region can thereby be achieved with uniform pressure; this makes it possible to achieve a stable electrical connection between the contact pins and the IC memory region so that processing for reading information from the IC memory region or writing information thereto can be performed in a stable manner. Furthermore, the arrangement of the contact means within the running range of the card carriage such that the contact means can be projected into or retracted from the IC exposure aperture of the card carriage enables the overall length of the card read/write apparatus to be reduced in comparison with the prior art and thereby enables the card read/write apparatus to be compactly sized.

The present invention can be worked in various modes without departing from its spirit or main characteristics. In all respects therefore the embodiments described above are to be interpreted merely by way of example and not by way of restriction. The scope of the present invention is defined by the patent claims and is not restricted in any way by the text of the specification. Furthermore, all variations or modifications falling within the equivalent scope of the claims fall within the scope of the present invention.

What is claimed is:

1. A card read/write apparatus having a main frame, a card carriage driving means disposed on the main frame and a card carriage which reciprocates in a first direction relative to the main frame by means of the card carriage driving means, for reading or writing information from or into an IC memory region of a card placed on the card carriage reciprocating by means of a card carriage driving means, comprising:

an IC exposure aperture formed in the card carriage, through which the IC memory region of the card is exposed when the card is mounted on the card carriage;

a contact holder provided on the main frame in a region where the card carriage reciprocates exclusive of a region where the card carriage is located, and having an upper surface on which contact pins are disposed; and raising and lowering means disposed on the main frame for raising and lowering the contact holder while maintaining the contact holder to be in parallel with the IC memory region and while constraining the contact holder against substantial movement in the first direction when the card carriage stops at a position where the IC exposure aperture confronts the contact holder so that the contact holder is protruded into or retracted from the IC exposure aperture whereby the contact pins are brought into contact with or move away from the IC memory region, wherein the raising and lowering means comprises:

a pair of guide shafts extending toward the card carriage;

a pair of bearing units provided at a side of the contact holder and formed with guide holes into which the guide shafts are inserted;

biasing means for biasing the contact holder normally in a direction away from the card carriage; and drive means for supporting the contact holder and for raising and lowering the contact holder along the guide shafts against a biasing force generated by the biasing means.

2. A card read/write apparatus according to claim 1, wherein the biasing means comprises a coil spring for normally biasing the contact holder in one direction.

3. A card read/write apparatus according to claim 1, wherein said drive means comprises:

a drive motor having a rotary shaft; and a shaft mounted in a position offset from the axial center of the rotary shaft of the drive motor and abutting a bottom face of the contact holder.

4. A card read/write apparatus according to claim 1, wherein the card is provided with an optical data storage region in addition to the IC memory region.

5. A card read/write apparatus according to claim 1, wherein the card is provided with an optical data storage region and magnetic recording region in addition to the IC memory region.

6. A card read/write apparatus according to claim 1, wherein the card is provided with an optical data storage region, a magnetic recording region and an embossed region in addition to the IC memory region.

7. A card read/write apparatus having a main frame, a card carriage driving means disposed on the main frame and a card carriage reciprocable in a first direction relative to the main frame by means of the card carriage driving means, the card read/write apparatus being adapted to read or write information from or into an IC memory region on a card placed on the card carriage, the apparatus comprising:

an IC exposure aperture formed in the card carriage through which aperture the IC memory region of the card is exposed when the card is mounted on the card carriage;

a contact holder carried by the main frame, the contact holder having an upper surface on which contact pins are disposed and being displaceable between a read/write position and a retracted position; and a contact holder displacement mechanism mounted on the main frame for moving the contact holder in a second direction toward the read/write position while maintaining the upper surface of the contact holder parallel with the IC memory region and constraining the contact holder against substantial movement in the first direction, the card carriage being adapted to be stopped at a position where the IC exposure aperture confronts the contact holder so that the contact holder is moveable into the IC exposure aperture whereby the contact pins are brought into contact with the IC memory region, wherein the contact holder displacement mechanism includes:
    a pair of guide shafts mounted on the main frame;
    a pair of bearings mounted on the contact holder, the guide shafts extending through said bearings;
    spring means biasing the contact holder in a direction away from the card carriage; and
    a drive operatively associated with the contact holder for displacing the contact holder along the guide shafts against the bias of the spring means.

8. A card read/write apparatus according to claim 7, wherein the spring means comprises a pair of coil springs.

9. A card read/write apparatus according to claim 7, wherein said drive comprises:
    a drive motor having a rotatable shaft; and
    a shaft mounted in a position offset from the rotary shaft of the drive motor and abutting a bottom face of the contact holder.

* * * * *